United States Patent [19]

Enbom

[11] Patent Number: 5,071,555
[45] Date of Patent: Dec. 10, 1991

[54] FILTER FOLDED IN A ZIG-ZAG CONFIGURATION

[75] Inventor: Kjell Enbom, Vagnhärad, Sweden

[73] Assignee: Camfil AB, Trosa, Sweden

[21] Appl. No.: 461,400

[22] Filed: Jan. 5, 1990

[30] Foreign Application Priority Data

Jan. 5, 1989 [EP] European Pat. Off. ......... 89850002.0

[51] Int. Cl.$^5$ ............................................. B01D 29/07
[52] U.S. Cl. .................... 210/493.5; 210/508; 55/475; 55/500; 55/DIG. 5; 493/333; 493/941
[58] Field of Search .............. 210/493.1, 493.2, 493.5, 210/506, 508; 55/475, DIG. 5, 500; 493/328, 331, 333, 941

[56] References Cited

U.S. PATENT DOCUMENTS

| | | | |
|---|---|---|---|
| 3,752,321 | 8/1973 | McLaren | 210/493.1 |
| 3,880,627 | 4/1975 | Morton | 55/499 |
| 3,914,116 | 10/1975 | Westlin | 55/500 |
| 4,135,900 | 1/1979 | Westlin et al. | |
| 4,227,953 | 10/1980 | Wasielewski et al. | 55/497 |
| 4,615,804 | 10/1986 | Wright | 210/493.1 |
| 4,728,426 | 3/1988 | Rudinger et al. | 55/500 |

FOREIGN PATENT DOCUMENTS

| | | |
|---|---|---|
| 2718217 | 11/1978 | Fed. Rep. of Germany . |
| 3219671 | 12/1983 | Fed. Rep. of Germany . |
| 8617256 | 1/1987 | Fed. Rep. of Germany . |
| 2490970 | 4/1982 | France . |
| 1272564 | 5/1972 | United Kingdom . |

Primary Examiner—Robert A. Dawson
Assistant Examiner—Wanda L. Millard
Attorney, Agent, or Firm—Burns, Doane, Swecker & Mathis

[57] ABSTRACT

An air filter comprising a sheet of filter material folded in a zig-zag configuration. A hardenable material is dispensed in a flowable state onto the sheet. The hardenable material has a varying thickness such that upon hardening, it holds the folds of the sheet apart in a selected orientation. The hardenable material may comprise glue to also secure the folds together. An air penetratable sheet can be secured to the fold edges at one or both sides of the filter.

10 Claims, 2 Drawing Sheets

FILTER FOLDED IN A ZIG-ZAG CONFIGURATION

RELATED INVENTION

This invention is related to that described in U.S. application Ser. No. 07/461,421 of Anders Svensson filed concurrently herewith.

BACKGROUND OF THE INVENTION

This invention is concerned with filters constituted of paper-like or other filter sheet material that is folded to a zig-zag shape, for instance so-called absolute filters, that is filters where practically no impurities pass through the filter. To obtain the least flow resistance through the filter, it is desired that the filter is zig-zag shaped with wedge-like cross-sections on each side of the filter. In this way, the flow through the filter is smooth and continuous with the same flow velocity all the way through and since the pressure over the filter surface is even, the entire surface is utilized. To ensure that the filter functions properly it is necessary that the wedge-like structure be kept open. This is, for instance, done by the insertion of wedge-like distance elements made of corrugated aluminum strips. The fabrication of these wedge-like strips is however rather expensive due to the tooling costs and of course also the cost of the aluminum material itself. Another way of securing the wedge-like shape is of course to hold the filter material in a surrounding fixture or frame. This is also costly and furthermore unsuited for large filters.

In view of the above comments, it is an object of the invention to obtain a filter with a wedge-like cross-section in a simple manner that is easy to carry out and therefore also possible to fabricate at low costs.

SUMMARY OF THE INVENTION

The above object is according to the invention achieved by applying to the filter material before it is folded deposits of a substance, for instance glue, synthetic resin or other suitable materials in such a pattern that they constitute spacer elements creating a greater space at the outer part of the wedges and a thinner distance element adjacent the apex of the wedges. In its simplest form this can be achieved by applying glue on both of the wedge sides at the wider end thereof (i.e., a double layer of glue) and on only one side close to the inner end thereof (i.e., a single glue layer). In other words, glue is applied in an intermittent way. Of course other ways to apply glue or other deposits can be used. A glue is preferably used since it will hold the folds of the filter together during fabrication and increase the strength of the filter when it is used or transported. The glue can be kept in an adhesive state until the folding has been done or it could be allowed to harden and then remelted so that it gets tacky on the surface.

BRIEF DESCRIPTION OF THE DRAWING

The objects and advantages of the invention will become apparent from the following detailed description of preferred embodiments thereof in connection with the accompanying drawings, in which like numerals designate like elements, and in which.

DETAILED DESCRIPTION OF PREFERRED EMBODIMENTS OF THE INVENTION

Figure 1:
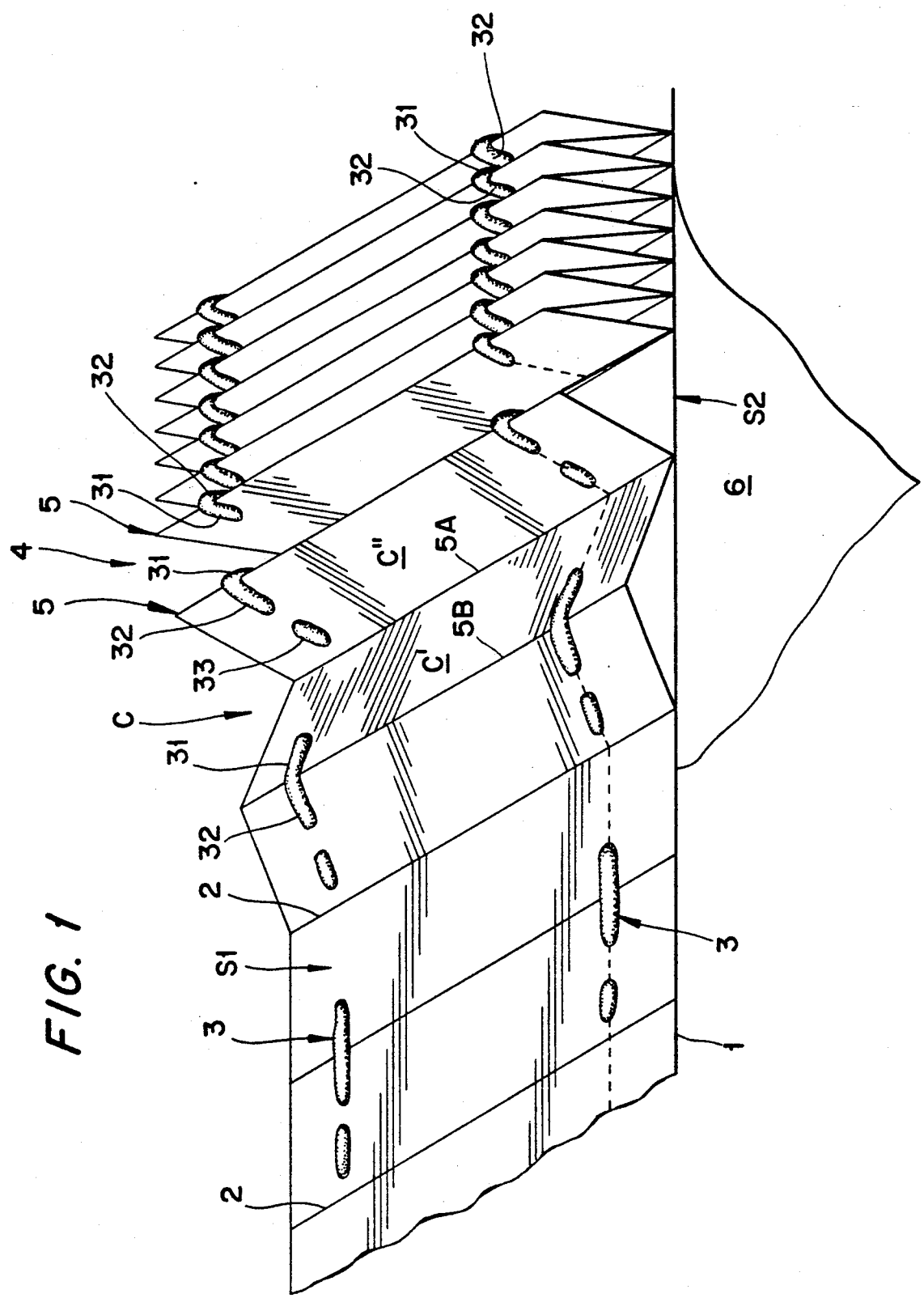
FIG. 1 shows a first embodiment of the invented filter in a perspective view.

In the drawing, a filter sheet material is designated by 1. When the filter is fabricated, folding lines 2 are preformed in the material by compressing the sheet material along parallel lines disposed transversely of a longitudinal length of the sheet. At the next station glue is administered to the upper and underside of the filter sheet material. As can be seen the glue is not administered in one continuous line but in short broken lines 3. The administering of glue 3 is such that when the filter sheet material in a consecutive fabrication step is folded into a zig-zag or fan configuration, a uniform wedge-like appearance is obtained comprised of open portions 4 and apex portions 5. As a result, each side S1 or S2 of the filter comprises spaced apart channels C, each channel formed by two opposing faces C' and C''. Each channel defines a width W and includes a wide end defined by the open portion 4 and a narrow end defined by an apex portion 5. An internal edge 5A of the apex portion 5 faces the open portion 4. Each open portion is disposed between the external edges 5B of two apex portions 5. Each channel C is of a diminishing cross-section CS in a direction from the wide end to the narrow end. This wedge-like appearance is obtained by allowing two opposite glue spots 31, 32 or glue lines to come in contact with one another at the open portion 4 of the channel, whereas in the vicinity of the narrow end of the channel a glue spot 33 is applied to only one of the two opposite faces of the channel. As a result, the channel C is caused to be wider at the open portion 4 than at the narrow end 5. The glue is administered in the same manner on the other side of the filter material.

Figure 2:
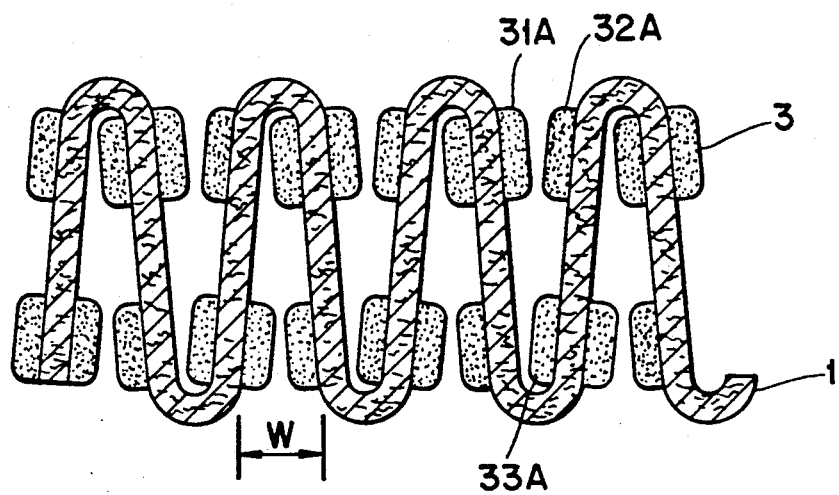
FIG. 2 is a cross-sectional view through a filter according to a second embodiment of the invention.
Figure 3:
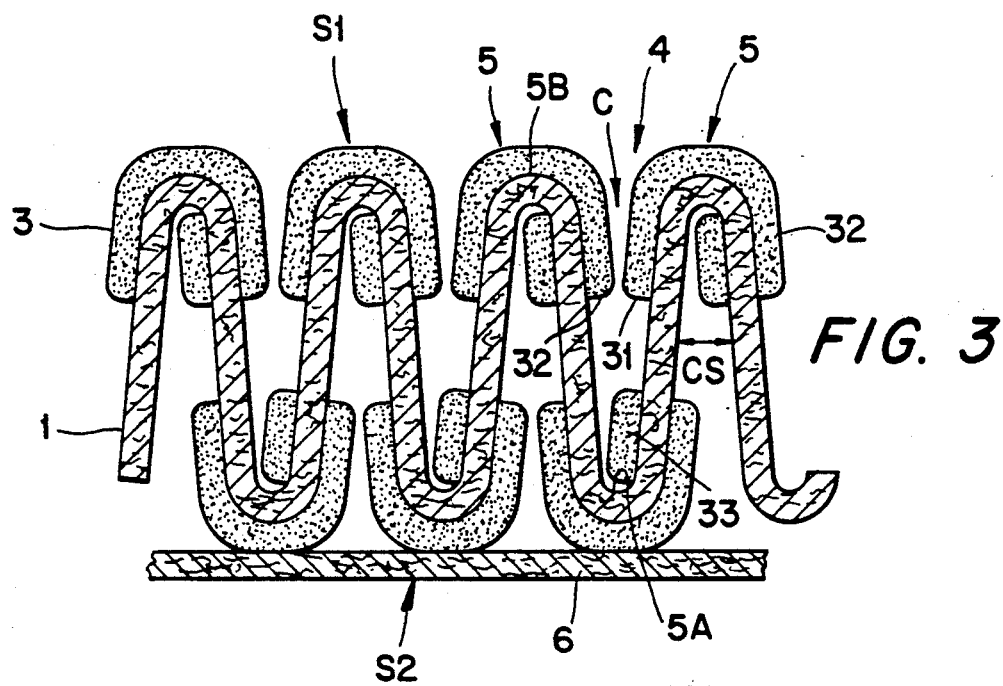
FIG. 3 is a cross-sectional view taken through a filter according to FIG. 1.
Figure 4:
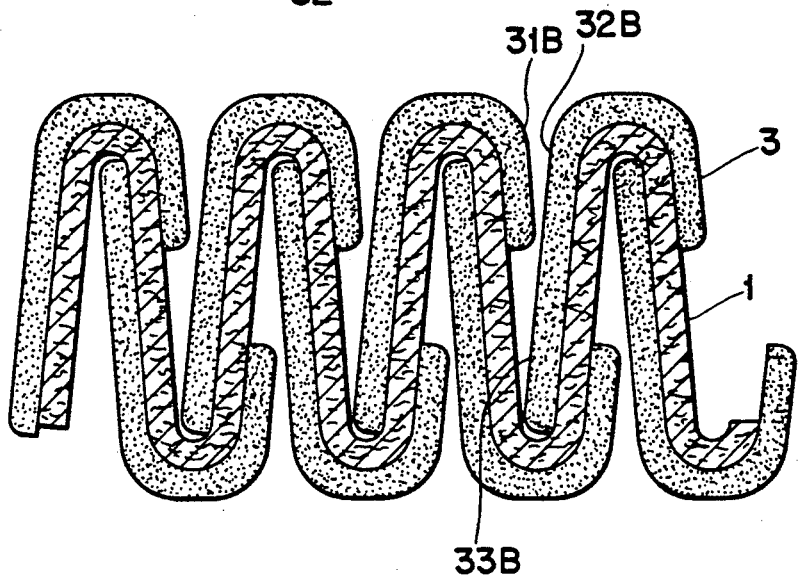
FIG. 4 is a cross-sectional view taken through a filter according to a third embodiment of the invention.

In the embodiment depicted in FIGS. 1 and 3, the glue spots 31 and 32 are integrally joined. This is not necessary, however, as demonstrated by the embodiment depicted in FIG. 2 wherein the glue spots 31A, 32A are spaced apart in the longitudinal direction. In each of the embodiments depicted in FIGS. 3 and 2, the spots 31, 32 (or 31A, 32A) are spaced longitudinally from the spot 33 (or 33A). However, that is not necessary as demonstrated by the embodiment depicted in FIG. 4 wherein all of the spots 31B, 32B, 33B are integrally joined.

It is also possible for the various glue lines or spots to be transversely staggered, i.e., they need not be longitudinally aligned. In each of the depicted embodiments, the glue lines are not continuous in the longitudinal direction, i.e., they are applied longitudinally discontinuously in a manner ensuring that each channel is of diminishing cross-section toward the narrow end of the channel.

In the shown embodiment the filter sheet material is fan-folded while the glue is still at least partially melted so that the glue can adhere to itself, thereby gluing the filter folds together. In this manner the distance between the folds and thus the surface area of the filter can be governed by the speed with which the folded filter is removed. A fast transportation of the filter results in rather wide wedges whereas a slow transportation makes a more compact filter with a greater surface area, i.e., the total surface area per unit length of filter is greater. Alternatively, it would be possible to allow the glue to harden before the folding takes place and then remelt the glue at the folding station.

If desired, the glue need not be remelted, whereby the glue will not glue the filter holds together. In that case, glue need not be used; other materials could be deposited on the filter sheet material in order to produce the wedge-like appearance when the filter is folded.

It is preferred, however, that glue be used in order to bind the filter folds together. Furthermore, it can be used to glue an additional air penetratable sheet material 6 of planar construction to the underside of the filter (see FIGS. 1 and 3). This material is forced-up and against the apex portions on the bottom or the lower side of the filter which constitutes the outlet side of the filter when the filter is used. Since the glue lines pass over the external edges 5B of the apexes 5, no additional glue has to be administered to fasten the penetratable sheet material 6.

If additional strength is desired, an additional air penetratable sheet material can be applied on the upper (i.e., inlet) side of the filter in the same way but would have to be pressed down against the filter by an air cushion or something else. Not only is filter strength increased in this way, but large particles are prevented from entering the fine structure of the filter, thereby keeping the inlet side of the filter cleaner to provide a longer life span for the filter.

In practice, the air stream exiting the filter through the sheet 6 are broken up into numerous multidirectional small flows each having a main directional component in the main flow direction and lateral direction components oriented laterally of the main flow direction. The lateral components tend to counteract and neutralize one another, whereby the resulting stream travels evenly in the man flow direction.

At later stages in the preparation of the filter, the folded sheet can be cut into suitable sizes.

Within the purview of the invention it is possible to allow the glue lines to be longitudinally discontinuous and transversely continuous and still obtain the desired wedge-like cross-section. This can be done by applying the glue lines in a lateral direction in such a way that the glue line at each apex of a wedge is located essentially lengthwise of the corresponding ridge so that the glue line or glue string is of single thickness, whereas at the opening of the wedge the glue lines will be of double thickness as in the above-described embodiments.

In the above description a few different ways of obtaining the wedge-like cross-section of the filter have been described. Of course, other patterns for the glue are also possible and the additionally applied sheet material could be applied by a separate gluing station.

The lines of glue need not be applied as a uniform thickness, but rather could be applied as a greater thickness at those areas wherein the glue will be disposed at the wide end of the channel. In that case, the glue need be applied on only one of the faces C', C" adjacent the wide end, rather than on both such faces. Alteratively in that case the glue could be applied in a longitudinally continuous manner, by varying the thickness at the appropriate places.

It should be noted that other patterns may also be used to obtain differently sized distance elements.

Depending on the machinery available for applying glue or other materials it is also possible to apply the glue with a thickness corresponding to the angle of the wedge, for instance by means of nozzles of different sizes.

Although the present invention has been descried in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A filter comprised of sheet material having first and second opposing sides, said sheet folded in a zig-zag configuration such that said first and second sides of said sheet form first and second sets of spaced-apart channels, each channel having an open wide end and a closed narrow end formed by mutually convergent channel faces such that a width of each channel becomes progressively smaller toward said narrow end, said first set of channels having their channel faces convergent in a first direction, and said second set of channels having their channel faces convergent in a second direction opposite said first direction, and spacer means for maintaining said convergent relationship of said channel faces, said spacer means comprising a hardenable material dispensed in a flowable state onto at least said first side of said sheet so as to lie within said first set of channels when said sheet is in a folded state, with some of said hardenable material being disposed adjacent said narrow ends of said first set of channels and some of said hardenable material being disposed adjacent said wide ends of said first set of channels, said hardenable material disposed adjacent said wide ends having a greater thickness than said hardenable material disposed adjacent said narrow ends when said filter is in said folded state, to maintain said convergent relationship of said channel faces, said thickness being measured in the direction of said channel width, wherein said hardenable material is dispensed onto both of said faces adjacent said wide end of each channel of said first set of channels and onto only one of said faces adjacent said narrow end of each channel of said first set of channels.

2. A filter according to claim 1, wherein said hardenable material comprises glue which holds together the folds of the filter.

3. A filter according to claim 1, wherein said hardenable material is dispensed onto both of said first and second sides of said sheet, whereby hardenable material also lies in said second set of channels.

4. A filter according to claim 1, wherein said hardenable material is dispensed in a longitudinally discontinuous pattern.

5. A filter according to claim 1, wherein said hardenable material is disposed in substantially all of said channels of said first side of said sheet.

6. In a method of making a filter in which a sheet of material having first and second opposing sides is folded in a zig-zag configuration along fold lines extending transversely of a longitudinal length of said sheet such that said first and second sides of said sheet form first and second sets of spaced-apart channels, each channel having an open wide end and a closed narrow end formed by mutually convergent channel faces such that a width of each channel becomes progressively smaller toward said narrow end, said first set of channels having their channel faces convergent in a first direction, and said second set of channels having their channel faces convergent in a second direction opposite said first direction, the improvement comprising maintaining said convergent relationship of said channel faces by dispensing a hardenable material in a flowable state onto at least said first side of said sheet prior to folding of said sheet so that after said folding step, said hardenable material lies within said first set of channels with some of said hardenable material disposed adjacent said narrow ends of said first set of channels, and some of said hardenable material disposed adjacent said wide ends of said first onset of channels, said hardenable material disposed adjacent said wide ends having a greater thickness than said hardenable material disposed adjacent said narrow ends following said folding step, said thickness being measured in the direction of said channel width so that said hardenable material spaces apart said channel faces by a greater distance at said wide ends than at said narrow ends, said hardenable material being dispensed in a longitudinally continuous manner wherein the thickness thereof is varied at longitudinally spaced locations.

7. A method according to claim 6, wherein said dispensing step comprises dispensing a hardenable material in the form of a glue which holds together the folds of the filter after said folding step.

8. A method according to claim 6, wherein said hardenable material is dispensed in a longitudinally discontinuous manner.

9. A filter comprised of sheet material folded in a zig-zag configuration to form spaced apart channels, each channel having opposing faces converging form a wide end of the channel to a narrow end of the channel, said faces held apart by a greater distance at said wide end than at said narrow end by spacer means comprised of a hardenable material dispensed in a flowable state onto at least one side of said sheet, said hardenable material having a greater thickness adjacent said wide end than adjacent said narrow end, said hardenable material being dispensed onto both of said faces adjacent said wide end and onto only one of said faces adjacent said narrow end.

10. In a method of making a filter in which a sheet of filter material is folded in a zig-zag configuration along fold lines extending transversely of a longitudinal length of the sheet to form spaced apart channels, each channel formed by two opposing faces which converge from a wide end of the channel toward a narrow end of the channel, the improvement comprising the step of dispensing a hardenable material in a flowable state onto at least one side of said sheet prior to folding of said sheet, said hardenable material being dispensed in such a pattern that upon subsequent folding of the sheet the hardenable material spaces apart the opposing faces of the respective channels by a greater distance at said wide end than at said narrow end, hardenable material being dispensed such that a thickness of said hardenable material adjacent said wide end is greater than a thickness thereof adjacent said narrow end, said hardenable material being dispensed in a longitudinally continuous manner wherein the thickness thereof is varied at longitudinally spaced locations.

* * * * *